(12) United States Patent
Kawataka et al.

(10) Patent No.: US 11,176,800 B2
(45) Date of Patent: Nov. 16, 2021

(54) POWER SUPPLY DEVICE

(71) Applicant: COSEL CO., LTD., Toyama (JP)

(72) Inventors: Nobuto Kawataka, Toyama (JP); Yuji Hirose, Toyama (JP); Shinji Moriya, Toyama (JP); Masanobu Hiramatsu, Toyama (JP); Hikaru Kobayashi, Toyama (JP); Yuta Usui, Toyama (JP)

(73) Assignee: COSEL CO., LTD., Toyama (JP)

( * ) Notice: Subject to any disclaimer, the term of this patent is extended or adjusted under 35 U.S.C. 154(b) by 0 days.

(21) Appl. No.: 16/953,452

(22) Filed: Nov. 20, 2020

(65) Prior Publication Data

US 2021/0166549 A1     Jun. 3, 2021

(30) Foreign Application Priority Data

Nov. 28, 2019   (JP) .............................. JP2019-215031

(51) Int. Cl.
*G06F 1/3212* (2019.01)
*G08B 21/18* (2006.01)
(Continued)

(52) U.S. Cl.
CPC .............. *G08B 21/185* (2013.01); *G08B 5/36* (2013.01); *H05B 47/105* (2020.01)

(58) Field of Classification Search
CPC ... G01R 19/16542; H02J 7/0021; H02J 7/0026; H02J 50/10; H02J 7/00302;
(Continued)

(56) References Cited

U.S. PATENT DOCUMENTS 7,302,186 B2 * 11/2007 Light .................. H04B 10/0799
                                                          398/137
8,891,970 B2 * 11/2014 Levinson ............. H04B 10/801
                                                          398/135
(Continued)

FOREIGN PATENT DOCUMENTS

JP        H05199747 A     8/1993
JP        2005151674 A    6/2005

*Primary Examiner* — Daniel Previl
(74) *Attorney, Agent, or Firm* — Holtz, Holtz & Volek PC (57) ABSTRACT

A power supply device is such that when an output voltage is abnormal, a system manager or the like can easily acquire information effective in identifying a cause of the abnormality. The power supply device includes a first light emitting element installed to be visually recognizable from an exterior, and a light emitting element control unit that drives the first light emitting element. When an output voltage is abnormal, the light emitting element control unit causes the first light emitting element to flash, thereby convert at least one of specific power supply operation information used for inferring a cause of the output voltage being abnormal and cause information inferred based on the specific power supply operation information into an optical digital signal formatted for serial communication, and causes the optical digital signal to be output from the first light emitting element. The power supply device includes a second light emitting element that is installed to be visually recognizable from the exterior, and is driven by the light emitting element control unit. When the output voltage is normal, the light emitting element control unit causes the second light emitting element to be statically illuminated.

5 Claims, 9 Drawing Sheets

(51) Int. Cl.
*G08B 5/36* (2006.01)
*H05B 47/105* (2020.01)

(58) Field of Classification Search
CPC .... H02J 7/00304; H02J 7/00716; H02J 7/025; Y02T 10/70; Y02T 10/7055; G06F 1/30; G06F 11/0754; G06F 1/24; G06F 1/26; G06F 1/3218; G06F 3/14; G06F 3/1431; G06F 9/4418; G09G 2330/021; G09G 2330/022; G09G 2360/04; G09G 3/3406; G09G 5/00; H02H 3/04; H02H 3/202; Y10S 715/975
USPC ......... 340/636.15, 636.19, 636.18, 641, 660, 340/679, 691.6, 693.1, 5.1, 7.55, 309.3
See application file for complete search history.

(56) References Cited

U.S. PATENT DOCUMENTS

| | | | | |
|---|---|---|---|---|
| 8,923,704 B2* | 12/2014 | Levinson | ............... | H04B 10/27 398/135 |
| 2006/0028179 A1* | 2/2006 | Yudahira | ............... | H02J 7/0026 320/133 |
| 2008/0181794 A1* | 7/2008 | Steinfels | ................ | F04B 35/06 417/234 |
| 2012/0187847 A1* | 7/2012 | Hamamoto | ............ | H05B 45/58 315/125 |
| 2014/0300993 A1* | 10/2014 | Otaguro | ................ | G11B 19/28 360/99.08 |
| 2017/0040886 A1* | 2/2017 | Leitner | ............. | H02M 3/33515 |

\* cited by examiner

|  | WHEN Vo IS NORMAL | WHEN Vo IS ABNORMAL |
|---|---|---|
| FIRST LIGHT EMITTING ELEMENT 22 | EXTINGUISHED | CONVERT AT LEAST ONE OF "SPECIFIC POWER SUPPLY OPERATION INFORMATION TDJ" AND "CAUSE INFORMATION GJ" INTO OPTICAL DIGITAL SIGNAL, AND OUTPUT OPTICAL DIGITAL SIGNAL FROM FIRST LIGHT EMITTING ELEMENT 22 |
| SECOND LIGHT EMITTING ELEMENT 24 | STATICALLY ILLUMINATED | EXTINGUISHED |

| TYPE | SPECIFIC POWER SUPPLY OPERATION INFORMATION TDJ ||| CAUSE INFORMATION GJ |
|---|---|---|---|---|
| | Vi RELATED INFORMATION | Io RELATED INFORMATION | ΔT RELATED INFORMATION | |
| 1 | Vi = NORMAL | Io = EXCESSIVE | — | · OVERCURRENT PROTECTION CIRCUIT HAS BEEN ACTIVATED, AND Vo IS DECREASING. |
| 2 | Vi = ZERO | Io = ZERO | — | · EXCESSIVE CURRENT IS FLOWING IN INPUT LINE, INPUT FUSE HAS BLOWN, AND POWER CONVERSION CIRCUIT 25 HAS STOPPED OPERATING. |
| 3 | Vi = NORMAL | Io = ZERO | — | · OVERVOLTAGE PROTECTION CIRCUIT HAS BEEN ACTIVATED, AND SWITCHING OPERATION OF POWER CONVERSION CIRCUIT 25 HAS STOPPED DUE TO LATCHING.<br>· OVERHEAT PROTECTION CIRCUIT HAS BEEN ACTIVATED, AND SWITCHING OPERATION OF POWER CONVERSION CIRCUIT 25 HAS STOPPED DUE TO LATCHING. |
| 4 | ... | ... | | ... |
| A | Vi = NORMAL | Io = ZERO | TEMPERATURE OF SWITCHING ELEMENT HAS RISEN TO DANGEROUS VALUE AFTER INTRODUCTION OF INPUT POWER SUPPLY 14 | · OVERHEAT PROTECTION CIRCUIT HAS BEEN ACTIVATED, AND SWITCHING OPERATION OF POWER CONVERSION CIRCUIT 25 HAS STOPPED DUE TO LATCHING. |

| | WHEN Vo IS NORMAL | WHEN Vo IS ABNORMAL |
|---|---|---|
| FIRST LIGHT EMITTING ELEMENT 54 | STATICALLY ILLUMINATED | CONVERT AT LEAST ONE OF "SPECIFIC POWER SUPPLY OPERATION INFORMATION DJ" AND "CAUSE INFORMATION GJ" INTO OPTICAL DIGITAL SIGNAL, AND OUTPUT OPTICAL DIGITAL SIGNAL FROM FIRST LIGHT EMITTING ELEMENT 54 |

POWER SUPPLY DEVICE

BACKGROUND OF THE INVENTION

Field of the Invention

The present invention relates to a power supply device that converts an input voltage into a predetermined output voltage, and outputs the output voltage.

Description of the Background Art

When a user system in which a power supply device is incorporated is operating, and when trouble occurs in the user system due to an abnormality occurring in an output voltage Vo of the power supply system, a system manager has to investigate the cause of the abnormality, and swiftly restore the user system to normal. Because of this, the system manager or a person in charge of maintenance needs to accurately ascertain under what kind of circumstance the power supply device is operating abnormally (the Vo abnormality circumstance), and to identify the cause of this kind of circumstance arising (the cause of the Vo abnormality).

Various cases are conceivable regarding the circumstance and cause of an abnormality of the output voltage Vo. For example, a case wherein an excessive load is applied to the power supply device, a protective circuit is activated, and the output voltage Vo decreases, a case wherein a lightning surge penetrates into an input line of the power supply device, an input fuse blows, and the output voltage Vo decreases, a case wherein an unexpectedly large noise current penetrates into the input line or an output line of the power supply device, the power supply device malfunctions, and the output voltage Vo becomes unstable, a case wherein an internal part of the power supply device accidentally fails, and the output voltage Vo decreases, and the like are included, and a wide variety of other cases are also conceivable.

There are more than a few cases wherein an abnormality of the output voltage Vo is not reproduced by removing the power supply device and investigating with the power supply device as an independent unit. Consequently, in order to accurately identify the circumstance and cause of an abnormality of the output voltage Vo, an initial investigation is preferably carried out in the state in which the abnormality occurs, that is, a state wherein the power supply device is incorporated in the user system.

When carrying out an investigation of an internal circuit of a power supply device, a measuring instrument such as an oscilloscope is normally connected to the internal circuit, and a voltage value, a current value, and an operational waveform of each unit are monitored. With a view to safety, such as preventing electrocution, however, it is often the case that the power supply device is such that the internal circuit is covered by a housing made of metal or a resin, or installed inside a housing of the user system, because of which connecting an oscilloscope or the like is difficult unless the housing is removed. Furthermore, there is a possibility of an environment in which noise is transmitted changing when an oscilloscope or the like is connected, because of which, if possible, investigation of the internal circuit is preferably carried out without making contact with the power supply device and the user system.

As disclosed in, for example, JP-A-5-199747, there is an existing switching power supply device that includes an output voltage display light emitting element, which is illuminated only when an output voltage is controlled to a normal value, and an input voltage display light emitting element, which is illuminated only when an input voltage is being supplied normally. This switching power supply device is such that by observing whether the two light emitting elements are illuminated or extinguished in a state wherein the power supply device is incorporated in a user system, it can be determined whether the circumstance or cause of an abnormality of the output voltage Vo is due to an overcurrent (an excessive load) or due to an input voltage loss (a power supply voltage loss).

Also, as disclosed in JP-A-2005-151674, there is a power supply device including display means that displays an input voltage supplied to an input end and an output voltage generated at an output end, wherein the display means displays a multiple of states of the input voltage and the output voltage using a display indicator formed of a multiple of LEDs. The power supply device is such that approximate values of the input voltage and the output voltage can be ascertained by observing the display indicator in a state wherein the power supply device is incorporated in a user system.

The power supply device of JP-A-5-199747 is such that the two light emitting elements simply switch between being illuminated and extinguished, because of which a total of only four kinds of information can be output. Also, the power supply devices of JP-A-5-199747 and JP-A-2005-151674 are such that only information relating to the input voltage and the output voltage can be displayed, but as there are more than a few cases wherein the cause of an abnormality of the output voltage Vo cannot be identified unless there is information other than the input voltage and the output voltage, it is desirable that more information can be acquired.

SUMMARY OF THE INVENTION

The invention, having been contrived in consideration of the heretofore described background art, has an object of providing a power supply device such that when an output voltage becomes abnormal, a system manager or the like can easily acquire information effective in identifying a cause of the abnormality.

The invention is a power supply device including a power conversion circuit that converts an input voltage into an output voltage, and including a first light emitting element installed to be visually recognizable from an exterior, and a light emitting element control unit that drives the first light emitting element, wherein, when the output voltage is abnormal, the light emitting element control unit converts at least one of specific power supply operation information used for inferring a cause of the output voltage being abnormal and cause information inferred based on the specific power supply operation information into an optical digital signal formatted for serial communication, and causes the optical digital signal to be output from the first light emitting element.

When the output voltage is abnormal, the light emitting element control unit controls the first light emitting element in such a way that a person can visually recognize a flashing that accords with the optical digital signal output from the first light emitting element. Also, a configuration can be such that the light emitting element control unit causes the first light emitting element to be statically illuminated when the output voltage is normal. Alternatively, a configuration may be such that when the output voltage is normal, the light emitting element control unit converts power supply operation information relating to an operation in a device interior into an optical digital signal of a frequency recognized to be statically illuminated when seen by a person, and causes the optical digital signal to be output from the first light emitting element.

Furthermore, a configuration can be such that the power supply device includes a second light emitting element that is installed to be visually recognizable from the exterior, and is driven by the light emitting element control unit, and the light emitting element control unit causes the second light emitting element to be statically illuminated when the output voltage is normal. Alternatively, a configuration can be such that the power supply device includes a second light emitting element that is installed to be visually recognizable from the exterior, and is driven by the light emitting element control unit, and when the output voltage is normal, the light emitting element control unit converts power supply operation information relating to an operation in a device interior into an optical digital signal of a frequency recognized to be statically illuminated when seen by a person, and causes the optical digital signal to be output from the second light emitting element.

In this case, a configuration is preferably such that the light emitting element control unit causes the first light emitting element to be extinguished when the output voltage is normal, and causes the optical digital signal of a frequency recognized to be statically illuminated when seen by a person to be output from the first light emitting element when the output voltage is abnormal. Also, the second light emitting element preferably emits light of a color differing from that of the first light emitting element.

Also, the invention is a power supply device including a power conversion circuit that converts an input voltage into an output voltage, and including a communication unit that has a light emitting element and a light receiving element installed in positions visually recognizable from an exterior, and carries out bidirectional communication with an external instrument by transmitting and receiving optical digital signals via the light emitting element and the light receiving element, wherein, when the output voltage is abnormal, the communication unit converts at least one of specific power supply operation information used for inferring a cause of the output voltage being abnormal and cause information inferred based on the specific power supply operation information into an optical digital signal formatted for serial communication, and transmits the optical digital signal toward the external instrument from the light emitting element, and on receiving a command from the external instrument via the light receiving element, the communication unit converts the specific power supply operation information corresponding to the command into an optical digital signal formatted for serial communication, and transmits the optical digital signal toward the external instrument from the light emitting element.

A configuration is preferably such that at least input voltage related information, for acquiring or inferring a state of the input voltage, and output current related information, for acquiring or inferring a state of an output current output by the power conversion circuit, are included in the specific power supply operation information.

Also, a configuration is preferably such that the power conversion circuit includes a first conversion unit that converts the input voltage into an intermediate voltage and a second conversion unit that converts the intermediate voltage into the output voltage, and at least input voltage related information, for acquiring or inferring a state of the input voltage, intermediate voltage related information, for acquiring or inferring a state of the intermediate voltage, and output current related information, for acquiring or inferring a state of an output current output by the second conversion unit, are included in the specific power supply operation information.

The power supply device of the invention is such that when the output voltage is abnormal, a system manager or the like can easily acquire specific power supply operation information or cause information for identifying a circumstance and a cause of the abnormality. Moreover, when investigating the circumstance and the cause of an output voltage abnormality, a large amount of information can be acquired, with an optical digital signal that can be transmitted wirelessly as a medium, in a state wherein the power supply device is incorporated in a user system, because of which the circumstance and the cause of the Vo abnormality can be efficiently and clearly identified.

BRIEF DESCRIPTION OF THE DRAWINGS

FIGS. 1A and 1B are drawings showing a first embodiment of a power supply device of the invention, wherein

FIGS. 7A and 7B are drawings showing a second embodiment of a power supply device of the invention, wherein

FIGS. 10A and 10B are drawings showing a third embodiment of a power supply device of the invention, wherein

DETAILED DESCRIPTION OF THE INVENTION

Figure 1A:
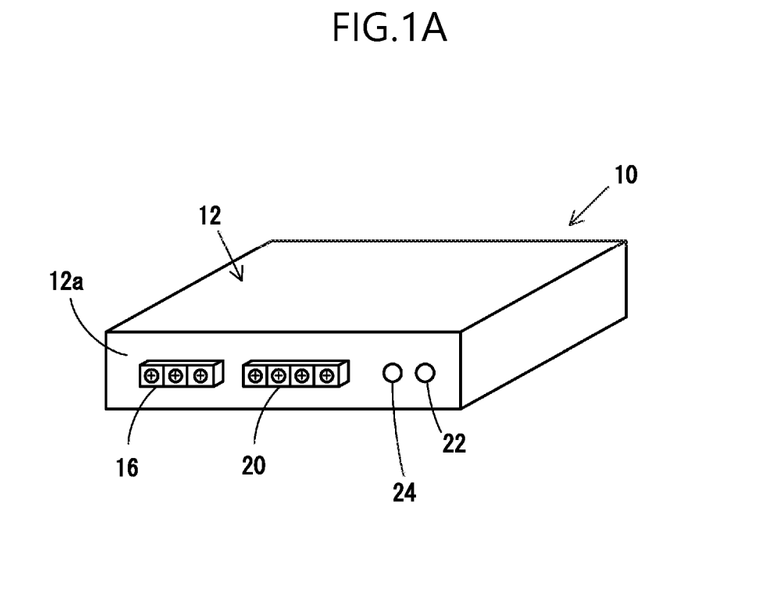
FIG. 1A is a perspective view showing an external appearance of the device.

Hereafter, a first embodiment of a power supply device of the invention will be described, based on FIGS. 1A to 6. A power supply device 10 of the embodiment has an approximately cuboid external form, and the six faces are covered by a housing 12, as shown in FIG. 1A. An input side terminal block 16, for wiring the power supply device 10 to an input power supply 14 of a user system, and an output side terminal block 20, for wiring the power supply device 10 to a load 18 of the user system, are provided on a front panel 12a, which is one side face of the housing 12, and first and second light emitting elements 22 and 24 visually recognizable from an exterior are provided.

Figure 1B:
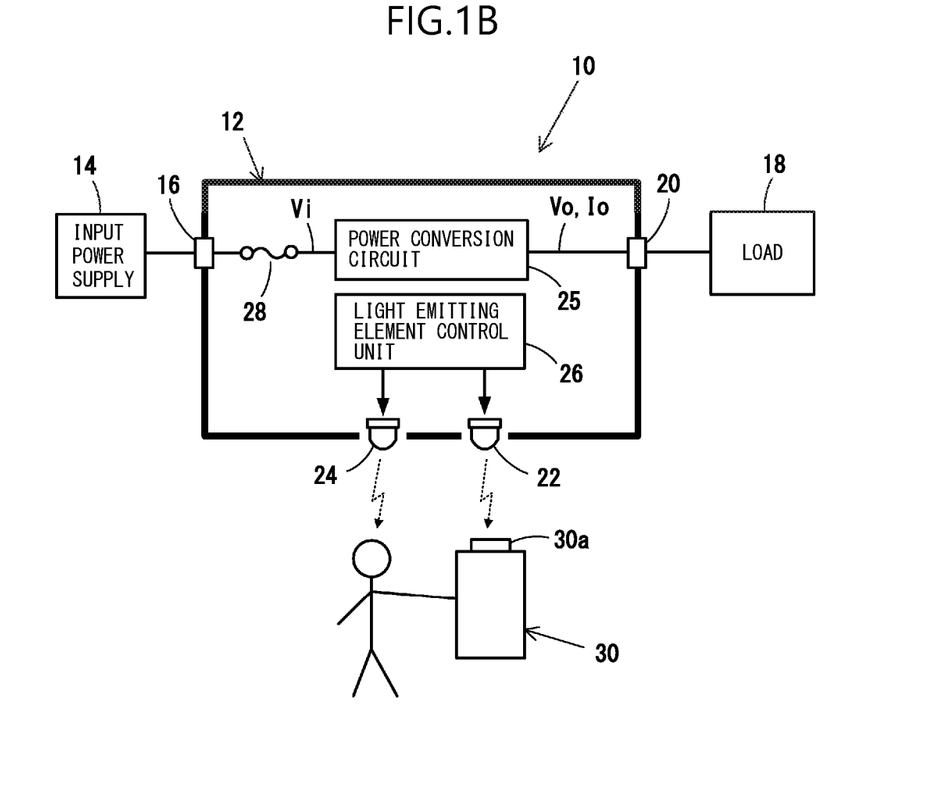
FIG. 1B is a circuit block diagram showing an internal configuration.

As shown in a circuit block diagram of FIG. 1B, the power supply device 10 includes a power conversion circuit 25, which is a switching converter or the like, that converts an input voltage Vi supplied from the input power supply 14 into an output voltage Vo and supplies the output voltage Vo and an output current Io to the load 18, the first and second light emitting elements 22 and 24, a light emitting element control unit 26 that drives the first and second light emitting elements 22 and 24, and a protective input fuse 28 inserted between the power conversion circuit 25 and the input side terminal block 16. The light emitting element control unit 26 is configured in an interior of a digital processor or the like.

Figure 2:
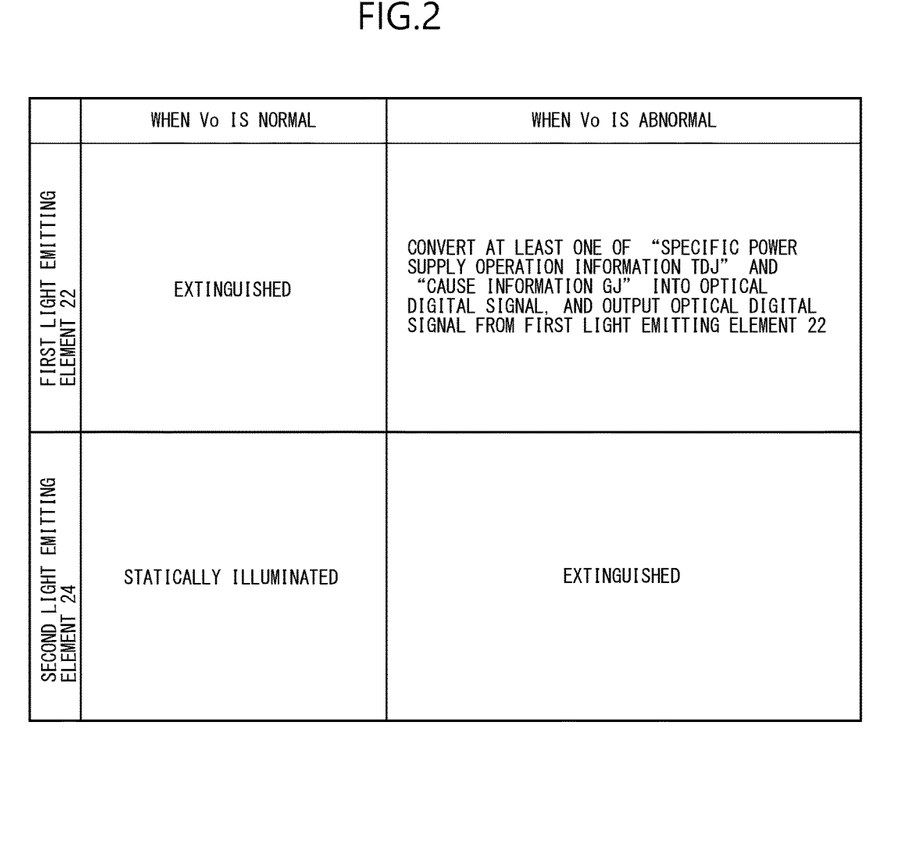
FIG. 2 is a table showing an operation of a light emitting element control unit of FIG. 1B.

When the output voltage Vo is normal, the light emitting element control unit 26 causes the first light emitting element 22 to be extinguished, and causes the second light emitting element 24 to be statically illuminated, as shown in FIG. 2. Further, when the output voltage Vo is abnormal, the light emitting element control unit 26 converts at least one of specific power supply operation information TDJ and cause information GJ, to be described hereafter, into a kind of optical digital signal shown in FIG. 3, causes the optical digital signal to be output from the first light emitting element 22, and causes the second light emitting element 24 to be extinguished.

The specific power supply operation information TDJ is power supply operation information relating to an operation in a device interior, and is specific information used for inferring a cause of the output voltage Vo being abnormal. What kind of power supply operation information is set as the specific power supply operation information TDJ is arbitrary, but at least input voltage related information for acquiring or inferring a state of the input voltage Vi (for example, a voltage value at a stage subsequent to the input fuse 28, or a voltage value at a place where the subsequent stage voltage is resistance divided) and output current related information for acquiring or inferring a state of the output current Io (for example, a voltage value of a current detecting resistor inserted into a path along which the output current Io flows, or a voltage value of a current detecting resistor inserted into a path along which a switching current proportional to the output current Io flows) are preferably included.

Figure 4:
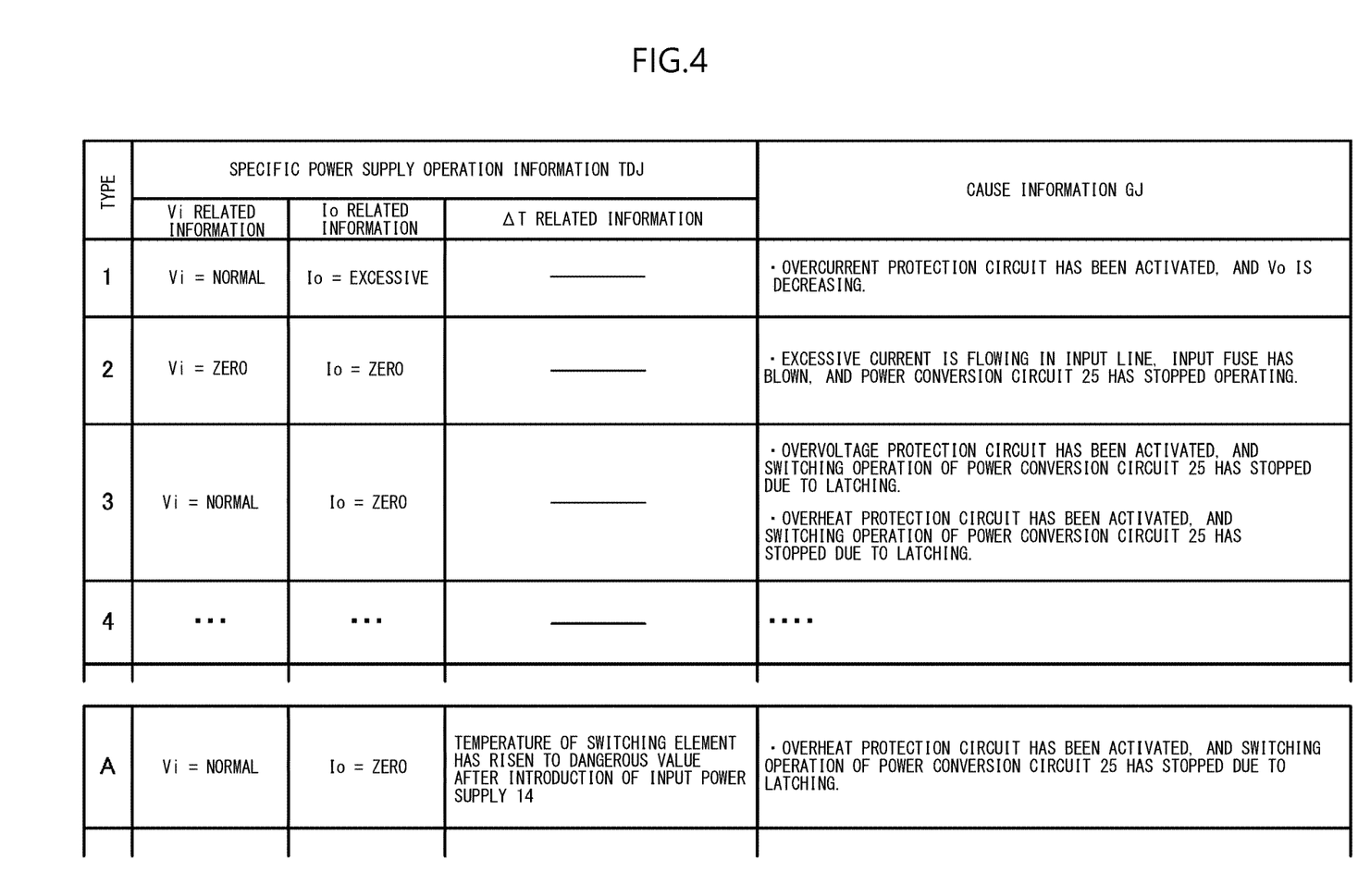
FIG. 4 is a table showing examples of specific power supply operation information and cause information.

The cause information GJ is information regarding the cause of the Vo abnormality inferred based on the specific power supply operation information TDJ. For example, in type 1, cause information GJ to the effect that "an overcurrent protection circuit has been activated, and the output voltage Vo is decreasing" is inferred based on input voltage related information to the effect that "Vi=normal" and output current related information to the effect that "Io=excessive", as shown in FIG. 4. In type 2, cause information GJ to the effect that "an excessive current is flowing in an input line, the input fuse 28 has blown, and the power conversion circuit 25 has stopped operating" is inferred based on input voltage related information to the effect that "Vi=zero" and output current related information to the effect that "Io=zero". In type 3, two items of cause information GJ, to the effect that "an overvoltage protection circuit has been activated, and a switching operation of the power conversion circuit 25 has stopped due to latching" and "an overheat protection circuit has been activated, and a switching operation of the power conversion circuit 25 has stopped due to latching", are inferred based on input voltage related information to the effect that "Vi=normal" and output current related information to the effect that "Io=zero". When input voltage related information and output current related information are included in the specific power supply operation information TDJ in this way, the cause of a Vo abnormality can be narrowed down with a certain degree of accuracy.

When wishing to infer the cause of a Vo abnormality with greater accuracy, it is sufficient to increase the number of kinds of specific power supply operation information TDJ. For example, type 3 is based only on input voltage related information and output current related information, because of which the cause information GJ cannot be narrowed down to one item, but when part temperature related information (a temperature rise of a switching element, a power transformer, or the like, power consumption of an internal circuit, or the like) is added, as in type A described in a bottom level of FIG. 4, the cause information GJ can be narrowed down to one item. In type A, the cause information GJ is narrowed down to one item, to the effect that "an overheat protection circuit has been activated, and a switching operation of the power conversion circuit 25 has stopped due to latching", based on input voltage related information to the effect that "Vi=normal", output current related information to the effect that "Io=zero", and part temperature related information to the effect that "the switching element temperature has risen to a dangerous value after introduction of the input power supply 14". When the number of kinds of specific power supply operation information TDJ is increased in this way, the cause of a Vo abnormality is more easily narrowed down.

As a format of an optical digital signal output from the first light emitting element 22 is arbitrary, a format such as, for example, a UART method or a 12C method, which are generic serial communication methods, can be used. Further, the optical digital signal can be read by a dedicated external instrument 30 (such as an inspection device including a receiving unit 30a compatible with each method) being provided. In this case, it is good when an optical digital signal of a frequency unrecognizable by a human is caused to be output for a predetermined short period, after which the first light emitting element 22 is caused to be statically illuminated for a while, and subsequently, the optical digital signal is caused to be output again, as in type 1 of FIG. 3. By so doing, the first light emitting element 22 appears to be statically illuminated, because of which a system manager or the like can clearly recognize that a Vo abnormality is occurring.

Figure 3:
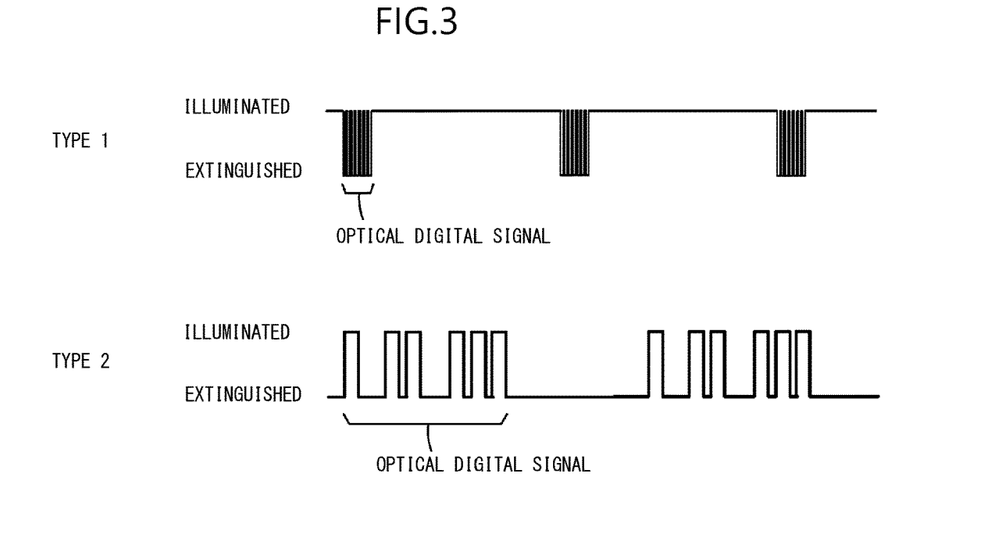
FIG. 3 is a time chart showing examples of a flashing operation of a first light emitting element.

Alternatively, an optical digital signal of an original format may be used, and the first light emitting element 22 is caused to flash slowly in order that at least one portion of contents of the optical digital signal can be visually recognized by a human, as in type 2 of FIG. 3. By so doing, the system manager or the like can recognize the optical digital signal without preparing the dedicated external instrument 30.

In the case of the power supply device 10, the second light emitting element 24 emits light when the output voltage Vo is normal, and the first light emitting element 22 emits light when the output voltage Vo is abnormal, because of which colors of light emitted by the two light emitting elements 22 and 24 are preferably mutually differing colors in order that the system manager or the like can determine with one glance whether the output voltage Vo is normal or abnormal. For example, the color of light emitted by the second light emitting element 24 is a color that provides the system manager or the like with a sense of ease (green or blue), and the color of light emitted by the first light emitting element 22 is a color that attracts the attention of the system manager or the like (red or orange).

Figure 5:
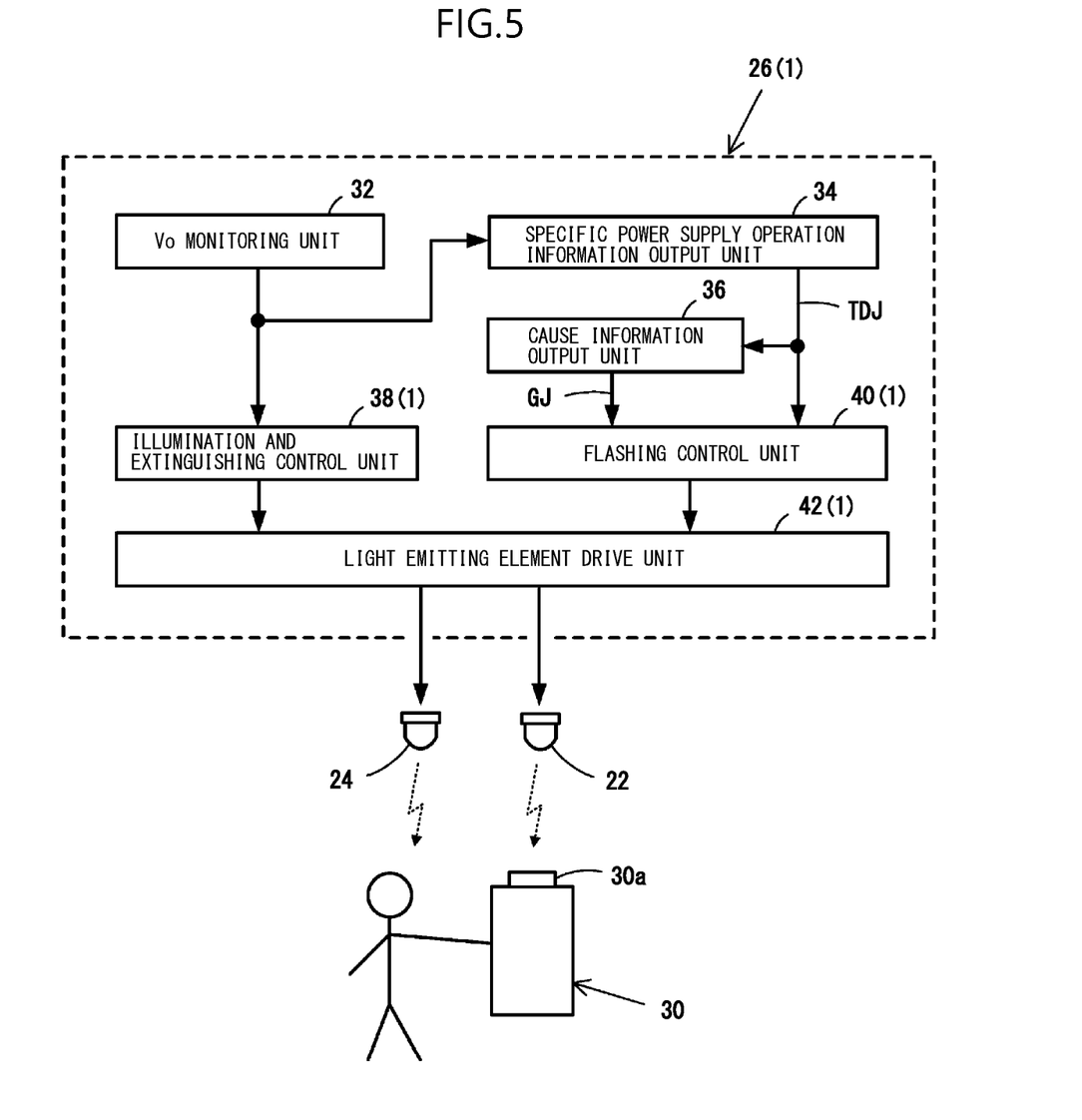
FIG. 5 is a circuit block diagram showing an example of an internal configuration of the light emitting element control unit of FIG. 1B.
Figure 6:
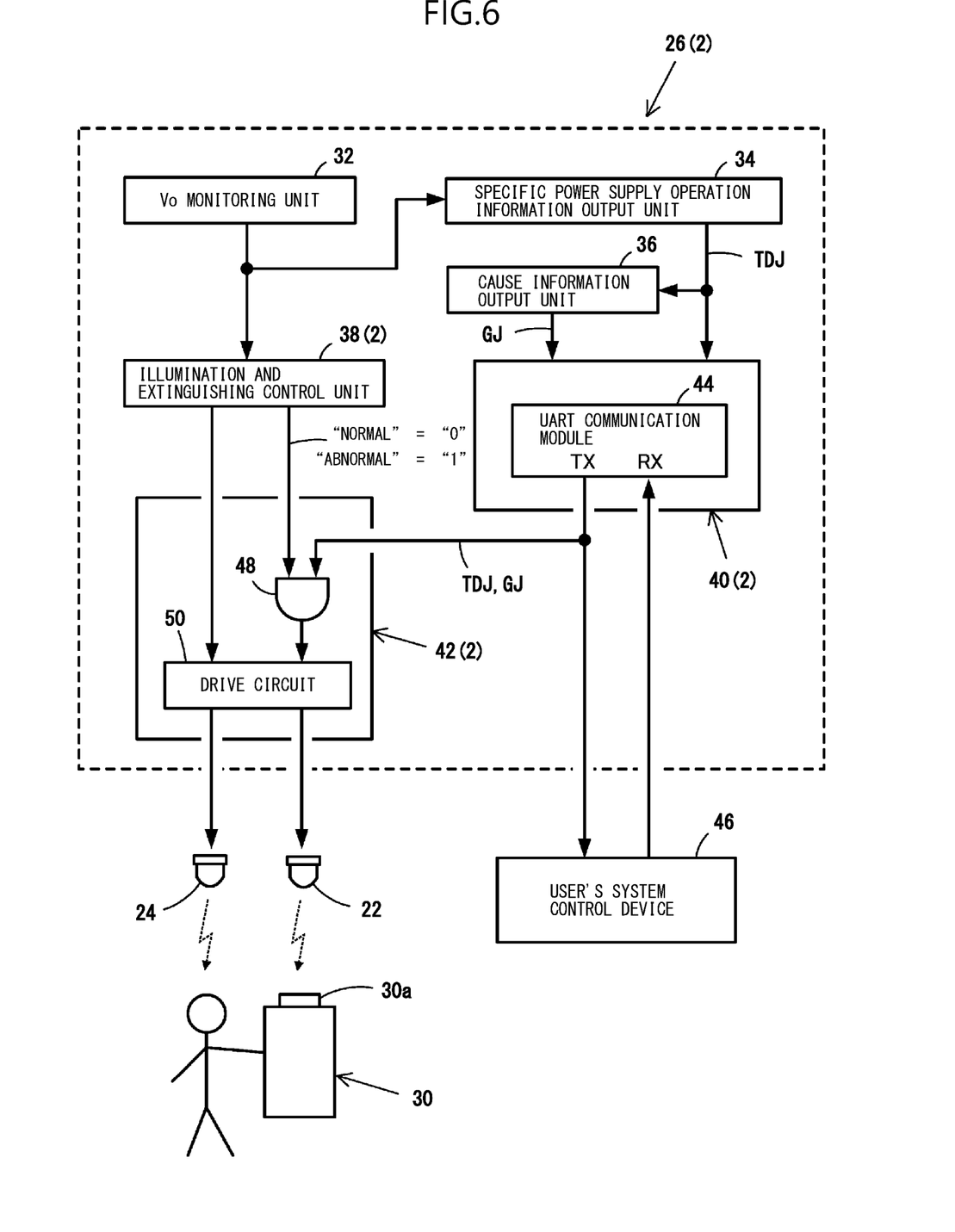
FIG. 6 is a circuit block diagram showing another example of an internal configuration of the light emitting element control unit of FIG. 1B.

An interior of the light emitting element control unit 26 can have, for example, the kinds of configuration shown in FIGS. 5 and 6. A light emitting element control unit 26(1) shown in FIG. 5 includes a Vo monitoring unit 32 that monitors the output voltage Vo and determines whether the output voltage Vo is normal or abnormal, a specific power supply operation information output unit 34 that acquires and outputs the specific power supply operation information TDJ when the Vo monitoring unit 32 determines that the output voltage Vo is abnormal, and a cause information output unit 36 that compiles and outputs the cause information GJ based on the specific power supply operation information TDJ. Furthermore, the light emitting element control unit 26(1) includes an illumination and extinguishing control unit 38(1) that controls an illumination and an extinguishing of the second light emitting element 24 based on a result of a determination by the Vo monitoring unit 32, a flashing control unit 40(1) that receives at least one of the specific power supply operation information TDJ and the cause information GJ and controls a flashing operation of the first light emitting element 22, and a light emitting element drive unit 42(1) that receives control signals output from the illumination and extinguishing control unit 38(1) and the flashing control unit 40(1) and drives the two light emitting elements 22 and 24.

The light emitting element control unit 26(1) can easily be configured using a generic digital processor or the like, and is particularly suited to causing the kind of optical digital signal of type 2 in FIG. 3 to be output when there is an abnormality of the output voltage Vo.

A light emitting element control unit 26(2) shown in FIG. 6 is such that the illumination and extinguishing control unit 38(1), the flashing control unit 40(1), and the light emitting element drive unit 42(1) included in the light emitting element control unit 26(1) are replaced by an illumination and extinguishing control unit 38(2), a flashing control unit 40(2), and a light emitting element drive unit 42(2). A characteristic of the light emitting element control unit 26(2) is that a serial communication-use communication module (herein, a UART communication module 44) routinely mounted in a generic digital processor or the like is utilized.

The UART communication module 44 is used for carrying out bidirectional communication with a user's system control device 46 with the power supply device 10 in a state incorporated in a user system, wherein the power supply device 10 receives a command from the system control device 46 via the UART communication module 44, causes the output voltage Vo to be activated or deactivated, and changes a setting value of the output voltage Vo. When a Vo abnormality occurs, the UART communication module 44 operates as one portion of the flashing control unit 40(2).

The light emitting element drive unit 42(2) includes an AND gate 48 and a drive circuit 50, and when the UART communication module 44 receives at least one of the specific power supply operation information TDJ and the cause information GJ, the UART communication module 44 generates a digital signal specifying a flashing operation of the first light emitting element 22, and outputs the digital signal toward one input of the AND gate 48.

The illumination and extinguishing control unit 38(2) generates a signal controlling an illumination and an extinguishing of the second light emitting element 24 based on a result of a determination by the Vo monitoring unit 32, and outputs the signal toward the drive circuit 50. Furthermore, the illumination and extinguishing control unit 38(2) outputs "0" when a result of a determination by the Vo monitoring unit 32 is normal, and "1" when a result is abnormal, toward another input of the AND gate 48.

When the result of a determination by the Vo monitoring unit 32 is normal, the AND gate 48 outputs a signal "0" causing the first light emitting element 22 to be extinguished toward the drive circuit 50, and when the determination result is abnormal, the AND gate 48 outputs a signal (a signal the same as a digital signal output by the UART communication module 44) controlling a flashing operation of the first light emitting element 22 toward the drive circuit 50. Further, the drive circuit 50 drives the second light emitting element 24 on receiving a control signal output from the illumination and extinguishing control unit 38(2), and drives the first light emitting element 22 on receiving a control signal output from the AND gate 48.

The light emitting element control unit 26(2) can easily be configured using a generic digital processor or the like, and is particularly suited to causing the kind of optical digital signal of type 1 in FIG. 3 to be output when there is an abnormality of the output voltage Vo. Furthermore, as a UART communication module routinely mounted in a digital processor is utilized effectively, there is an advantage in that there is no need to provide a dedicated flashing control unit inside the digital processor. Although FIG. 6 shows a configuration of the UART communication module 44 carrying out communication with the user's system control device 46, the light emitting element control unit 26(2) may also be applied to a power supply device that does not include this kind of communication function.

The power supply device 10 is such that when the output voltage Vo is abnormal, the system manager or the like can easily acquire specific power supply operation information TDJ or cause information GJ for identifying the cause of the abnormality. Moreover, when investigating a circumstance and a cause of an output voltage abnormality, a large amount of information (specific power supply operation information TDJ and cause information GJ) can be acquired, with an optical digital signal that can be transmitted wirelessly as a medium, in a state wherein the power supply device is incorporated in a user system, because of which the circumstance and the cause of the Vo abnormality can be efficiently and clearly identified.

When the output voltage Vo is normal, the light emitting element control unit 26 causes the second light emitting element 24 to be illuminated statically, as shown in FIG. 2, but the light emitting element control unit 26 may also convert appropriate power supply operation information DJ into an optical digital signal using an optical signal of a frequency unrecognizable by a human, and cause the optical digital signal to be output from the second light emitting element 24. The power supply operation information DJ is information relating to an operation in the device interior when the output voltage Vo is normal, and differs in nature from the specific power supply operation information TDJ used for inferring the cause of the output voltage Vo being abnormal. By adopting a configuration such that the power supply operation information DJ is output when the output voltage Vo is normal, the system manager or the like can confirm that the power supply device 10 is operating normally using numerical data, and can be aware in advance of a sign that an abnormality is likely to occur.

Figure 7A:
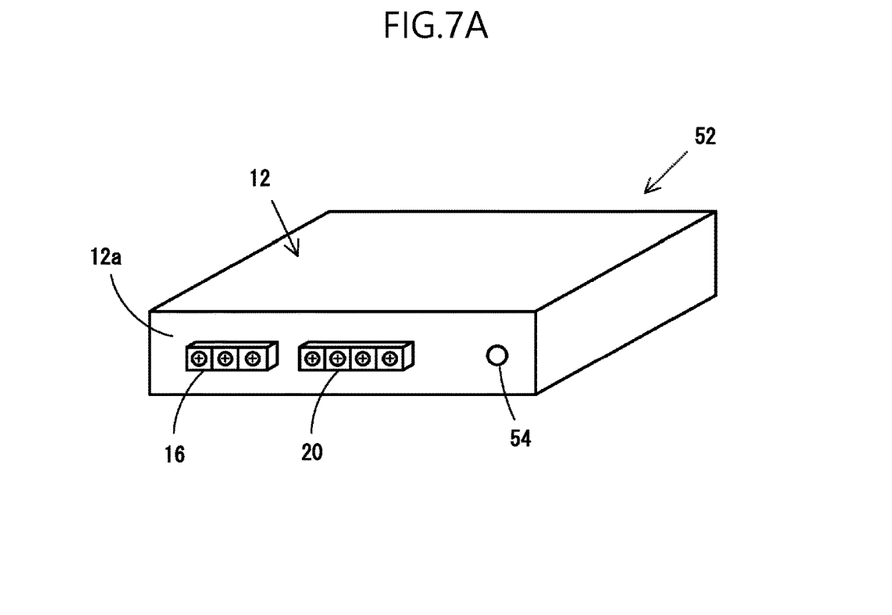
FIG. 7A is a perspective view showing an external appearance of the device.

Next, a second embodiment of a power supply device of the invention will be described, based on FIGS. 7A to 9. Herein, the same reference sign is allotted to a configuration the same as that of the power supply device 10, and a description thereof is omitted. A power supply device 52 of the embodiment has an approximately cuboid external form, and the six faces are covered by the housing 12, as shown in FIG. 7A. Further, a first light emitting element 54 visually recognizable from the exterior is provided on the front panel 12a, which is one side face of the housing 12.

Figure 7B:
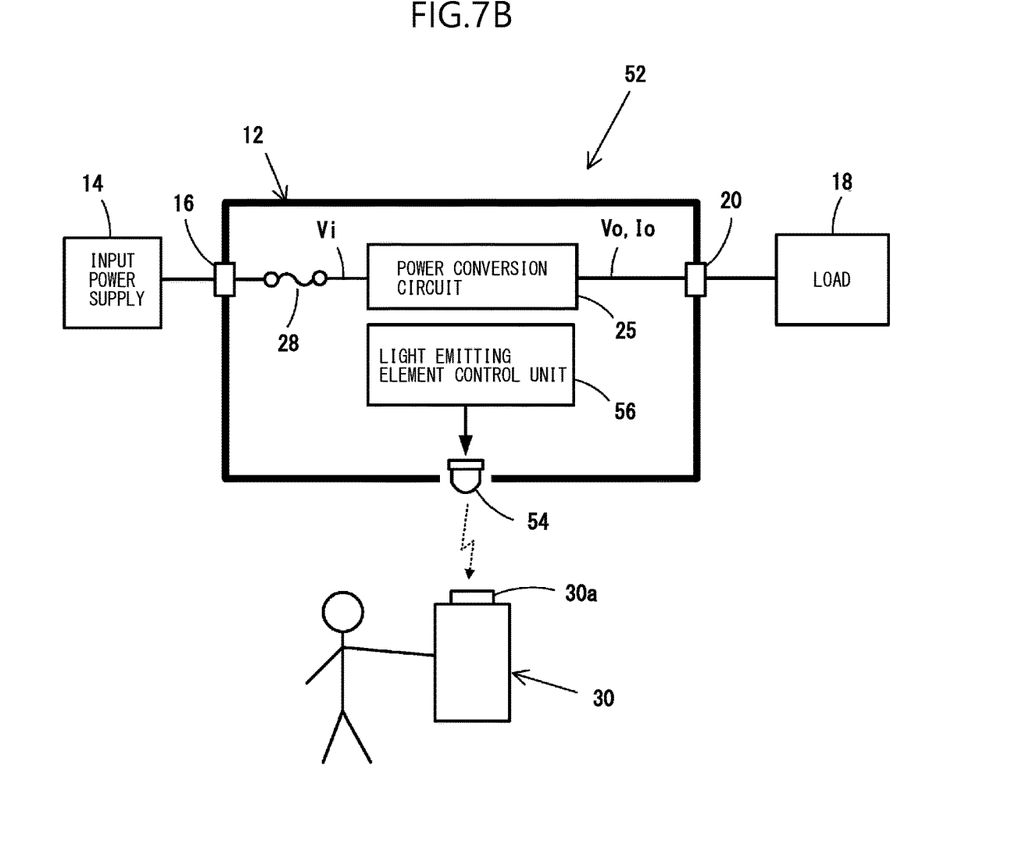
FIG. 7B is a circuit block diagram showing an internal configuration.

As shown in a circuit block diagram of FIG. 7B, the power supply device 52 includes the same power conversion circuit 25 and fuse 28 as the power supply device 10, and further includes the first light emitting element 54, and a light emitting element control unit 56 that drives the first light emitting element 54. The light emitting element control unit 56 is configured in an interior of a digital processor or the like.

Figure 8:
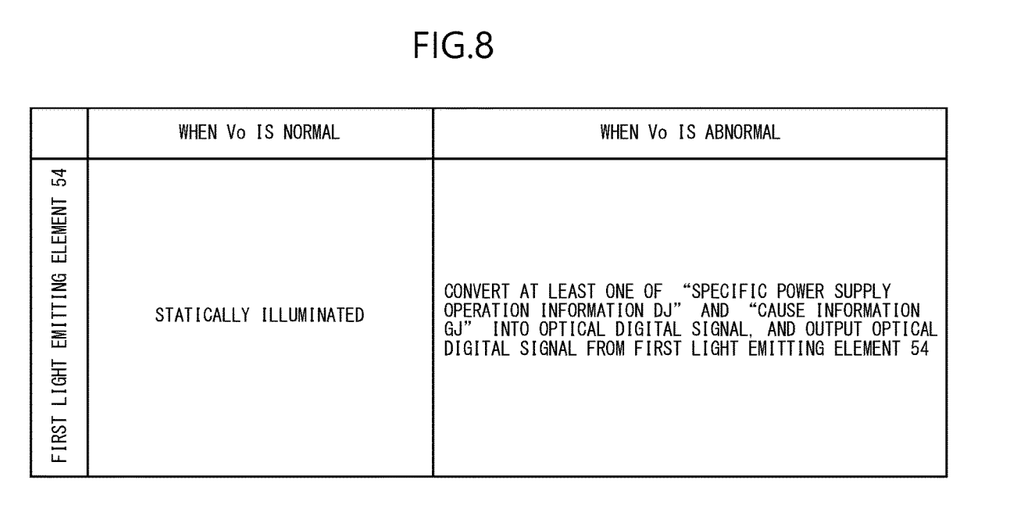
FIG. 8 is a table showing an operation of a light emitting element control unit of FIG. 7B.

The light emitting element control unit 56 causes the first light emitting element 54 to be statically illuminated when the output voltage Vo is normal, as shown in FIG. 8. Further, when the output voltage Vo is abnormal, the light emitting control unit 56 causes the first light emitting element 54 to flash, thereby converting at least one of the specific power supply operation information TDJ and the cause information GJ into an optical digital signal, and causing the optical digital signal to be output from the first light emitting element 54.

As a format of an optical digital signal output from the first light emitting element 54 is arbitrary, a format such as, for example, a UART method or a I2C method, which are generic serial communication methods, can be used. Further, the optical digital signal can be read by the external instrument 30 being prepared. In this case, it is good when an optical digital signal of a frequency unrecognizable by a human is caused to be output for a predetermined short period, after which the first light emitting element 54 is caused to be extinguished for a while, and subsequently, the optical digital signal is caused to be output again, as in type 1 of FIG. 9. By so doing, the first light emitting element 54 appears to be repeatedly statically illuminated and extinguished when the output voltage Vo is abnormal, because of which the system manager or the like can easily distinguish this from a light emitting state when the output voltage Vo is normal (a state of static illumination), and can clearly recognize that a Vo abnormality is occurring.

Figure 9:
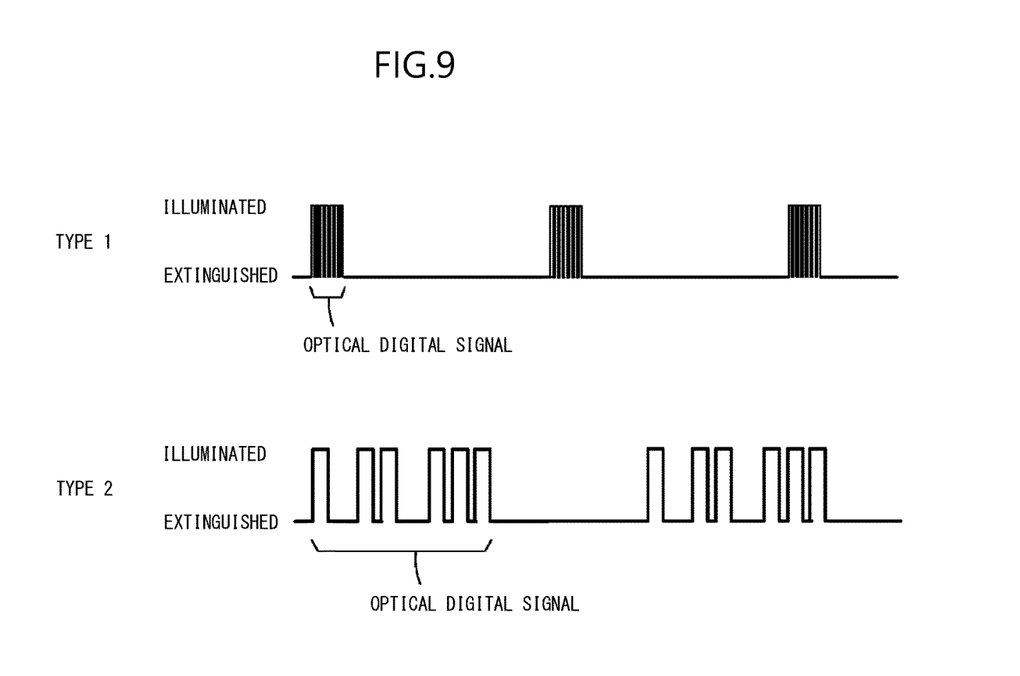
FIG. 9 is a time chart showing examples of a flashing operation of a first light emitting element.

Alternatively, an optical digital signal of an original format may be used, and the first light emitting element 54 is caused to flash slowly in order that contents of the optical digital signal can be recognized by a human, as in type 2 of FIG. 9. By so doing, the system manager or the like can read the optical digital signal without preparing the dedicated external instrument 30.

An operation of the light emitting element control unit 56 can be realized using, for example, configurations the same as the configurations shown in FIGS. 5 and 6. Further, an operational advantage the same as that of the power supply device 10 can also be obtained with the power supply device 52 of the embodiment.

When the output voltage Vo is normal, the light emitting element control unit 56 causes the first light emitting element 54 to be statically illuminated, as shown in FIG. 8, but the light emitting element control unit 56 may also cause the appropriate power supply operation information DJ to be output as an optical digital signal from the first light emitting element 54 by causing the first light emitting element 54 to flash using an optical digital signal of a frequency unrecognizable by a human. As heretofore described, the power supply operation information DJ is information relating to an operation in the device interior when the output voltage Vo is normal. By adopting a configuration such that the power supply operation information DJ is output when the output voltage Vo is normal, the system manager or the like can confirm that the power supply device 52 is operating normally using numerical data, and can be aware in advance of a sign that an abnormality is likely to occur.

Figure 10A:
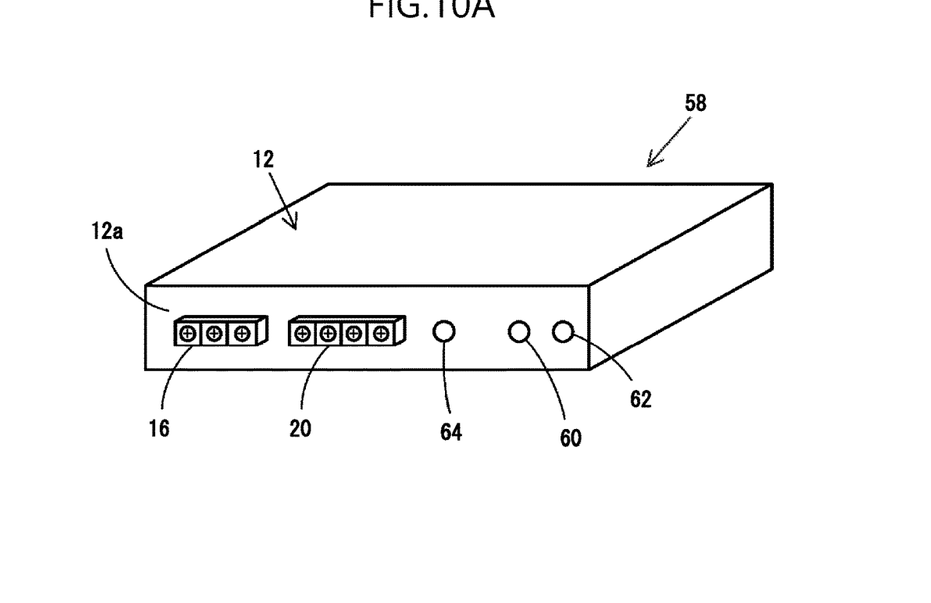
FIG. 10A is a perspective view showing an external appearance of the device.

Next, a third embodiment of a power supply device of the invention will be described, based on FIGS. 10A to 11. Herein, the same reference sign is allotted to a configuration the same as that of the power supply device 10, and a description thereof is omitted. A power supply device 58 of the embodiment has an approximately cuboid external form, and the six faces are covered by the housing 12, as shown in FIG. 10A. Further, a light emitting element 60, a light receiving element 62, and an auxiliary light emitting element 64 visually recognizable from the exterior are provided on the front panel 12a, which is one side face of the housing 12.

Figure 10B:
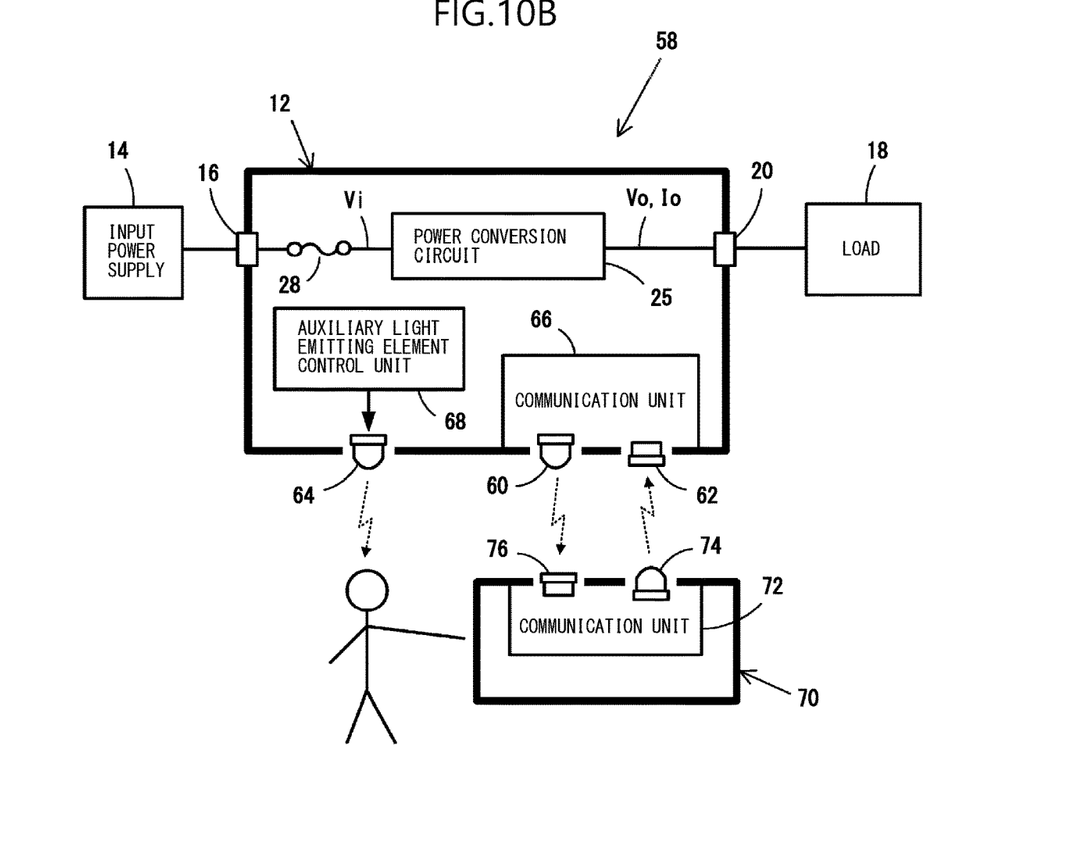
FIG. 10B is a circuit block diagram showing an internal configuration.

As shown in a circuit block diagram of FIG. 10B, the power supply device 58 includes the same power conversion circuit 25 and fuse 28 as the power supply device 10, and includes a communication unit 66 having the light emitting element 60 and the light receiving element 62, the auxiliary light emitting element 64, and an auxiliary light emitting element control unit 68 that drives the auxiliary light emitting element 64. The communication unit 66 (excepting the light emitting element 60 and the light receiving element 62) and the auxiliary light emitting element control unit 68 are configured in an interior of a digital processor or the like.

The communication unit 66 includes a function of, when the output voltage Vo is abnormal, converting at least one of the specific power supply operation information TDJ, which is used for inferring the cause of the output voltage Vo being abnormal, and the cause information GJ, which is inferred based on the specific power supply operation information TDJ, into an optical digital signal, and transmitting the optical digital signal toward an external instrument 70 from the light emitting element 60. Furthermore, the communication unit 66 includes a function of, on receiving a command from the external instrument 70 via the light receiving element 62, converting specific power supply operation information TDJ corresponding to the command into an optical digital signal, and transmitting the optical digital signal toward the external instrument 70 from the light emitting element 60.

The external instrument 70 is an inspection device or the like operated by the system manager or the like, and includes a communication unit 72 compatible with a UART method. The communication unit 72 is provided with a light receiving element 76 for receiving an optical digital signal and a light emitting element 74 for transmitting an optical digital signal, and can carry out bidirectional communication with the communication unit 66 of the power supply device 58.

Figure 11:
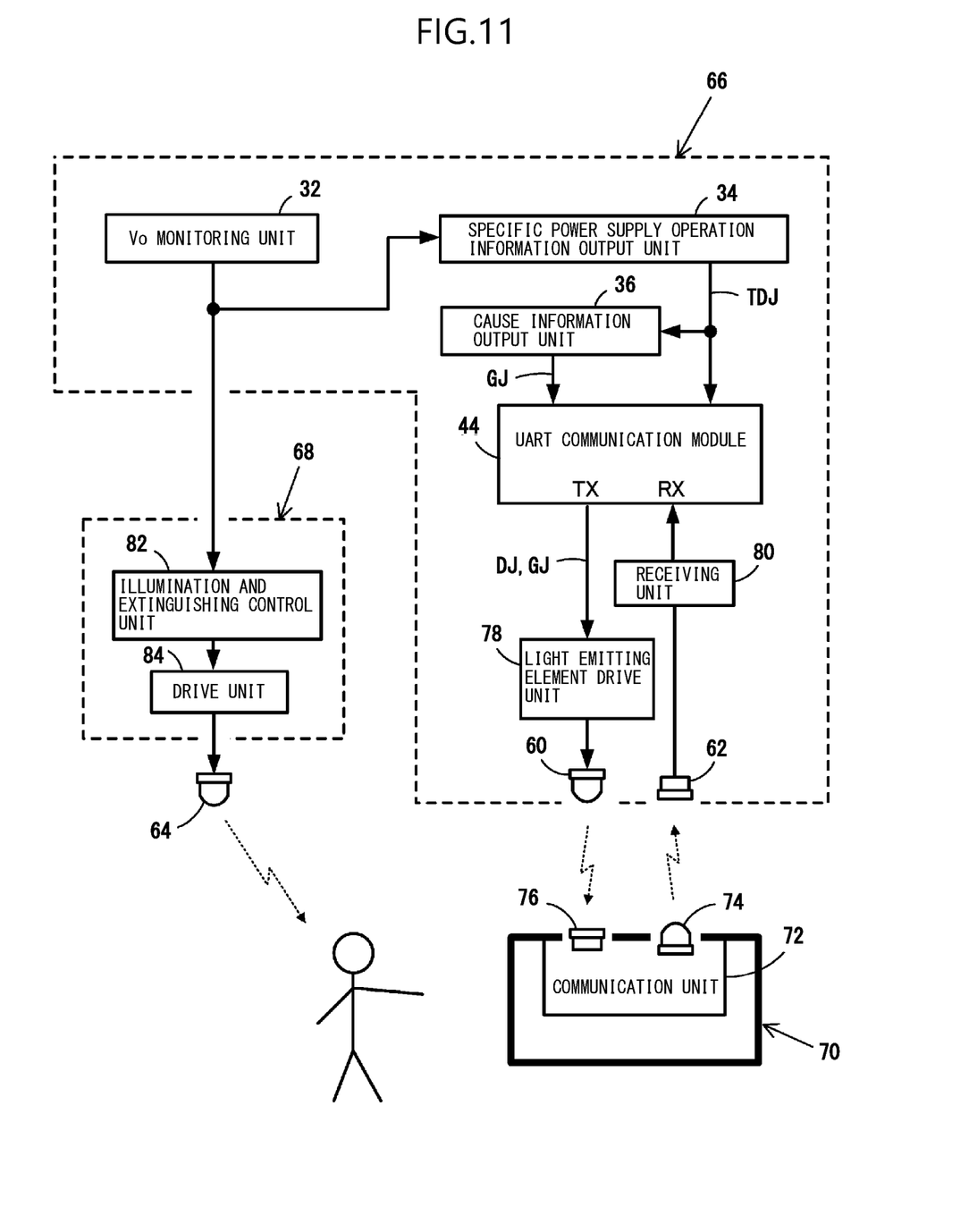
FIG. 11 is a circuit block diagram showing an example of an internal configuration of a communication unit of FIG. 10B.

A kind of configuration shown in FIG. 11, for example, can be adopted for an interior of the communication unit 66. The communication unit 66 shown in FIG. 11 includes the same Vo monitoring unit 32, specific power supply operation information output unit 34, and cause information output unit as those heretofore described. Furthermore, the communication unit 66 includes the UART communication module 44, which generates a digital signal specifying a flashing operation of the light emitting element 60 on receiving the specific power supply operation information TDJ or the cause information GJ, and a light emitting element drive unit 78, which drives the light emitting element 60 based on a digital signal generated by the UART communication module 44. Furthermore, the communication unit 66 includes a receiving unit 80, which receives an optical digital signal transmitted from the external instrument 70 via the light receiving element 62, converts the optical digital signal into an electrical signal, and outputs the electrical signal to the UART communication module 44. The two functions of the communication unit 66 are realized by the blocks cooperating.

The auxiliary light emitting element control unit 68 includes an illumination and extinguishing control unit 82 and a drive unit 84, and controls an illumination and an extinguishing of the auxiliary light emitting element 64 based on a result of a determination by the Vo monitoring unit 32. Specifically, the auxiliary light emitting element control unit 68 causes the auxiliary light emitting element 64 to be statically illuminated when the result of a determination by the Vo monitoring unit 32 is normal, and causes the auxiliary light emitting element 64 to be extinguished when a determination result is abnormal. The auxiliary light emitting element 64 and the auxiliary light emitting element control unit 68 may be omitted when not needed.

Next, one example of a method of using the power supply device 58 will be introduced. Herein, it is assumed that the communication unit 66 of the power supply device 58 is programmed in such a way as to transmit only narrowed down cause information GJ, and the specific power supply operation information TDJ that forms the basis for the cause information GJ, to the external instrument 70 when a Vo abnormality occurs. For example, when a Vo abnormality corresponding to type 3 of FIG. 4 occurs, the communication unit 66 transmits input voltage related information to the effect that "Vi=normal" output current related information to the effect that "Io=zero", and two items of cause information GJ to the effect that "an overvoltage protection circuit has been activated, and a switching operation of the power conversion circuit 25 has stopped due to latching" and "an overheat protection circuit has been activated, and a switching operation of the power conversion circuit 25 has stopped due to latching".

When a Vo abnormality corresponding to type 3 actually occurs when the user system is operating, the auxiliary light emitting element 64 is extinguished, the light emitting element 60 flashes, and an optical digital signal (the specific power supply operation information TDJ and the cause information GJ of type 3) is output.

When seeing that the auxiliary light emitting element 64 has been extinguished, the system manager or the like recognizes that a Vo abnormality has occurred, reads an optical digital signal output from the light emitting element 60 using the external instrument 70, and recognizes that the Vo abnormality corresponds to type 3.

As the system manager or the like wishes, if possible, to narrow the two items of cause information GJ down to one, the system manager or the like operates the external instrument 70 to transmit an optical digital signal whose contents are, for example, "add and transmit part temperature related information among other specific power supply operation information TDJ" toward the communication unit 66.

When contents of the additionally transmitted part temperature related information are to the effect that "there is no part whose temperature has risen to a predetermined value or greater", the system manager or the like can narrow the cause of the Vo abnormality down to "an overvoltage protection circuit has been activated, and a switching operation of the power conversion circuit 25 has stopped due to latching". Conversely, when the contents are to the effect that "the switching element temperature has risen to a dangerous temperature", the system manager or the like can narrow the cause of the Vo abnormality down to "an overheat protection circuit has been activated, and a switching operation of the power conversion circuit 25 has stopped due to latching".

In this way, the power supply device 58 is such that by the heretofore described kind of interaction being carried out between the system manager or the like and the power supply device 58, the cause of a Vo abnormality can be efficiently and clearly narrowed down by utilizing knowledge of the system manager or the like.

A power supply device of the invention is not limited to the heretofore described embodiments. For example, a light emitting element control unit, not being limited to the configurations of the light emitting element control units 26(1) and 26(2) shown in FIGS. 5 and 6, may be changed to a configuration differing from the light emitting element control units 26(1) and 26(2), provided that an operation that is an object of the invention can be carried out. The same applies to a configuration of the communication unit 66 shown in FIG. 11.

Details of the specific power supply operation information TDJ and the cause information GJ shown in FIG. 4 are examples, and are set appropriately in accordance with a configuration of an internal circuit including a power conversion circuit. Note that, as previously described, at least input voltage related information and output current related information are preferably included in the specific power supply operation information TDJ. When a power conversion circuit is configured of a first conversion unit that converts the input voltage Vi into an intermediate voltage Vc (for example, a power factor improving AC-DC converter) and a second conversion unit that converts the intermediate voltage Vc into the output voltage Vo (for example, a DC-DC converter), the same advantages as heretofore described are obtained by adding intermediate voltage related information.

Part temperature related information, output voltage related information (a value of the output voltage Vo, a value of a ripple occurring in the output voltage Vo, and the like), switching related information (a value of a switching frequency, a presence or otherwise of a PWM ramp voltage, and the like), and the like may be added to the specific power supply operation information TDJ, whereby the cause of a Vo abnormality can be inferred more precisely.

In addition, it is not essential for each light emitting element to be installed on a front panel of a housing. Rather, each light emitting element may be installed in any place that can be visually recognized from the exterior. For example, when a power supply device is a single substrate power supply that does not have a housing, it is sufficient that each light emitting element is mounted on a face of the two faces (a front face and a back face) of the substrate that can be visually recognized from the exterior when the substrate is attached to a user system.

What is claimed is:

1. A power supply device, comprising:
   a power conversion circuit that converts an input voltage into an output voltage;
   a first light emitting element installed to be visually recognizable from an exterior;
   a second light emitting element that is installed to be visually recognizable from the exterior; and
   a light emitting element control unit that drives the first light emitting element and the second light emitting element,
   wherein:
   when the output voltage is abnormal, the light emitting element control unit converts at least one of specific power supply operation information used for inferring a cause of the output voltage being abnormal and cause information inferred based on the specific power supply operation information into a first optical digital signal formatted for serial communication, and causes the first optical digital signal to be output from the first light emitting element;

when the output voltage is normal, the light emitting element control unit converts power supply operation information relating to an operation in a device interior into a second optical digital signal of a frequency recognized to be statically illuminated when seen by a person, and causes the second optical digital signal to be output from the first light emitting element;

when the output voltage is normal, the light emitting element control unit causes the second light emitting element to be statically illuminated; and the first optical digital signal and the second optical digital signal output from the first light emitting element are readable by a dedicated external instrument comprising an inspection device including a receiving unit that is compatible with a method of the serial communication.

2. The power supply device according to claim 1, wherein the light emitting element control unit causes the first optical digital signal of a frequency recognized to be statically illuminated when seen by a person to be output from the first light emitting element when the output voltage is abnormal.

3. The power supply device according to claim 1, wherein the second light emitting element emits light of a color differing from that of the first light emitting element.

4. The power supply device according to claim 1, wherein at least input voltage related information, for acquiring or inferring a state of the input voltage, and output current related information, for acquiring or inferring a state of an output current output by the power conversion circuit, are included in the specific power supply operation information.

5. The power supply device according to claim 1, wherein
the power conversion circuit includes a first conversion unit that converts the input voltage into an intermediate voltage and a second conversion unit that converts the intermediate voltage into the output voltage, and
at least input voltage related information, for acquiring or inferring a state of the input voltage, intermediate voltage related information, for acquiring or inferring a state of the intermediate voltage, and output current related information, for acquiring or inferring a state of an output current output by the second conversion unit, are included in the specific power supply operation information.

\* \* \* \* \*